United States Patent
Gao et al.

(10) Patent No.: US 10,941,956 B2
(45) Date of Patent: Mar. 9, 2021

(54) DATA PROCESSING METHOD, REFRIGERANT LEAKAGE DETECTION METHOD, SYSTEM FAILURE DETECTION METHOD AND SYSTEM PERFORMANCE DETECTION METHOD

(71) Applicant: Carrier Corporation, Palm Beach Gardens, FL (US)

(72) Inventors: Xiangyu Gao, Shanghai (CN); Hui Zhai, Shanghai (CN); Runfu Shi, Shanghai (CN); Guangyu Shen, Shanghai (CN); YuHui Kuang, Shanghai (CN); Yu Zhu, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 9 days.

(21) Appl. No.: 16/380,545

(22) Filed: Apr. 10, 2019

(65) Prior Publication Data
US 2019/0316800 A1 Oct. 17, 2019

(30) Foreign Application Priority Data
Apr. 13, 2018 (CN) .......................... 201810329970.4

(51) Int. Cl.
*F24F 11/63* (2018.01)
*F24F 11/52* (2018.01)
*F25B 49/00* (2006.01)

(52) U.S. Cl.
CPC .............. *F24F 11/63* (2018.01); *F24F 11/52* (2018.01); *F25B 49/005* (2013.01); *F25B 2500/222* (2013.01)

(58) Field of Classification Search
CPC ........ F24F 11/63; F24F 11/52; G01M 99/005; G01M 3/00; F25B 49/005;
(Continued)

(56) References Cited

U.S. PATENT DOCUMENTS 7,444,251 B2 10/2008 Nikovski et al.
8,800,309 B2 8/2014 Buda et al.
(Continued)

FOREIGN PATENT DOCUMENTS

CN 102788403 A 11/2012
CN 102939213 A 2/2013
(Continued)

OTHER PUBLICATIONS

Kim, Minsung, et al., "Design of a Steady-State Detector for Fault Detection and Diagnosis of a Residential Air Conditioner", Abstract, International Journal of Refrigeration, vol. 31, Issue 5, Aug. 2008, 3 pages.
(Continued)

*Primary Examiner* — Ziaul Karim
(74) *Attorney, Agent, or Firm* — Cantor Colburn LLP

(57) ABSTRACT

A steady-state data processing method includes resetting a cumulative change of target determination data and a data detection period as 0; obtaining the detected target data; calculating the cumulative change of the target data. When the calculated cumulative change of the target data is less than a preset threshold, adjusting the data detection period, or when the calculated cumulative change of the target data is not less than the preset threshold, recording a data detection period. When the recorded data detection period is less than a preset time threshold, determining a target data result obtained in the period as unsteady-state data of the device; or when the recorded data detection period is not less than the preset time threshold, determining the target data obtained in the data detection period as steady-state data.

14 Claims, 2 Drawing Sheets

(58) Field of Classification Search
CPC ............ F25B 2500/222; F25B 2500/19; F25B 2600/01; F25B 2700/171; F25B 2700/2106; F25B 49/02
See application file for complete search history.

(56) References Cited

U.S. PATENT DOCUMENTS

| | | | |
|---|---|---|---|
| 9,146,048 | B2 | 9/2015 | Shelton |
| 9,222,712 | B1 | 12/2015 | Zugibe et al. |
| 2011/0167853 | A1* | 7/2011 | Kawaai ............... F25B 5/02 62/228.3 |
| 2012/0209439 | A1* | 8/2012 | Inoue ............... G06Q 10/04 700/291 |
| 2012/0283990 | A1 | 11/2012 | Hrncar et al. |
| 2014/0238060 | A1* | 8/2014 | Tamaki ............ F25B 49/02 62/127 |
| 2015/0219376 | A1 | 8/2015 | Douglas et al. |
| 2015/0345820 | A1* | 12/2015 | Okamoto ............ F24F 11/30 702/182 |
| 2016/0146488 | A1 | 5/2016 | Ochiai et al. |
| 2017/0234561 | A1 | 8/2017 | Lin et al. |
| 2017/0343230 | A1 | 11/2017 | Popli et al. |

FOREIGN PATENT DOCUMENTS

| | | |
|---|---|---|
| CN | 204100499 U | 1/2015 |
| CN | 104677551 A | 6/2015 |
| CN | 104315666 B | 3/2017 |
| CN | 104964404 B | 10/2017 |
| CN | 107560073 A | 1/2018 |

OTHER PUBLICATIONS

Navarro-Esbri, J., et al., "A Vapour Compression Chiller Fault Detection Tech. Based on Adaptive Algorithms. App. to Online Refrigerant Leakage Detection", Abstract, International Journal of Refrigeration, vol. 29, Issue 5, Aug. 2006, 3 pages.

Tassou, S.A., et al., "Fault Diagnosis and Refrigerant Leak Detection in Vapour Compression Refrigeration Systems", Abstract, International Journal of Refrigeration, vol. 28, Issue 5, Aug. 2005, 3 pages.

European Search Report for application EP 19167562.8, dated Aug. 30, 3019, 6 pages.

* cited by examiner

DATA PROCESSING METHOD, REFRIGERANT LEAKAGE DETECTION METHOD, SYSTEM FAILURE DETECTION METHOD AND SYSTEM PERFORMANCE DETECTION METHOD

FOREIGN PRIORITY

This application claims priority to Chinese Patent Application No. 201810329970.4, filed Apr. 13, 2018, and all the benefits accruing therefrom under 35 U.S.C. § 119, the contents of which in its entirety are herein incorporated by reference.

TECHNICAL FIELD

The present application relates to the field of data analysis, and more particularly, to a data processing method and an application method thereof in air source air conditioner control.

BACKGROUND ART

With the development of air conditioners becoming increasingly mature, the further development direction at present is to analyze the actual operation state of on-site air conditioners, such as system performance detection and analysis and system fault detection and analysis. In analysis, data sources of air conditioners in a steady operation state are required to facilitate the accurate execution of these analytical methods. As a specific example of an analysis scenario, for air source air conditioners (cooling-only or heat pump type), the refrigerant leak problem may result in reduction of system efficiency, environmental pollution, and additional waste of refrigerant charge. In some countries or regions, it may be taxed or fined. Therefore, it is extremely necessary to timely detect and warn this problem. However, during the operation of the device, its operation state is continually changing. If data is collected in some stages when the operation state changes greatly, the data collected is not suitable as a basis for the determination of the refrigerant leak problem because it may cause a false determination very likely.

Therefore, how to obtain the steady-state data of an air conditioner in a steady operation state is a technical problem urgent to be solved.

SUMMARY OF THE INVENTION

The present application is intended to provide a data processing method for obtaining steady-state data in real time monitoring.

The present application is further intended to provide a refrigerant leak detecting method for an air source air conditioner that performs analysis and processing based on steady-state data.

The present application is further intended to provide a system performance detecting method for an air source air conditioner that performs analysis and processing based on steady-state data.

The present application is further intended to provide a system fault detecting method for an air source air conditioner that performs analysis and processing based on steady-state data.

To achieve the objectives of the present application, according to one aspect of the present application, a steady-state data processing method is provided, including S110, resetting a cumulative change of target data and a data detection period as 0; S120, obtaining the target data; S130, obtaining the cumulative change of the target data, and comparing the obtained cumulative change with its preset threshold; S140, when the cumulative change of the target data is less than the preset threshold, adjusting the data detection period, and then returning to S120; or when the cumulative change of the target data is not less than the preset threshold, comparing the current data detection period with a preset time threshold; and S150, when the data detection period is greater than the preset time threshold, determining the target data obtained in the data detection period as steady-state data; or when the data detection period is not greater than the preset time threshold, determining the target data obtained in the data detection period as unsteady-state data. According to this method, steady-state data can be obtained and subsequent analysis and processing can be performed.

Optionally, in S120, the target data is obtained in real time.

Optionally, the target data includes a first type of target data of an air source air conditioner: compressor frequency or compressor capacity, outdoor ambient temperature, and water inlet temperature of a heat exchanger.

Optionally, the cumulative change of the target data is as follows: the cumulative change of the compressor frequency or the compressor capacity is ±5%; the cumulative change of the outdoor ambient temperature is ±1° C.; and the cumulative change of the inlet water temperature of the heat exchanger is ±1° C.

Optionally, the target data includes a second type of target data of the air source air conditioner, including one or more of the following: subcooling degree of the air conditioner, suction superheat degree of a compressor, outlet water temperature of the heat exchanger, expansion valve opening, exhaust temperature of the compressor, suction temperature of the compressor, exhaust saturation temperature of the compressor, suction saturation temperature of the compressor, fan speed, inlet saturation temperature of an economizer, outlet temperature of the economizer, and expansion valve opening of the economizer.

Optionally, the cumulative change of the target data is as follows: the cumulative change of the subcooling degree of an air conditioning unit is ±1° C.; the cumulative change of the suction superheat degree of the compressor is ±1° C.; the cumulative change of the outlet water temperature of the heat exchanger is ±1° C.; the cumulative change of the expansion valve opening is ±5%; the cumulative change of the exhaust temperature of the compressor is ±5° C.; the cumulative change of the suction temperature of the compressor is ±5° C.; the cumulative change of the exhaust saturation temperature of the compressor is ±1° C.; the cumulative change of the suction saturation temperature of the compressor is ±1° C.; the cumulative change of the fan speed is ±5%; the cumulative change of the inlet saturation temperature of the economizer is ±1° C.; the cumulative change of the outlet saturation temperature of the economizer is ±1° C.; and the cumulative change of the expansion valve opening of the economizer is ±5%.

Optionally, the time preset threshold is 5 minutes.

According to another aspect of the present application, further provided is a refrigerant leak detecting method for an air source air conditioner, including S210, performing the data processing method as described above; and S220, determining, based on the obtained steady-state data, whether a refrigerant leak occurs in the air source air conditioner.

Optionally, the method further includes S230, taking an alarm action when a refrigerant leak occurs in the air source air conditioner.

Optionally, when the target data includes the first type of target data, the steady-state data obtained in S220 includes the first type of target data only.

Optionally, when the target data includes the second type of target data, the steady-state data obtained in S220 includes all of the first type of target data; and one or more of the second type of target data.

Optionally, the steady-state data obtained in S220 includes all of the first type of target data; and the expansion valve opening in the second type of target data.

Optionally, the steady-state data obtained in S220 includes all of the first type of target data; and the suction superheat degree of the compressor and the subcooling degree of the air conditioner.

According to still another aspect of the present application, further provided is a system fault detecting method for an air source air conditioner, comprising S310, performing the steady-state data processing method as described above; and S320, determining, based on the obtained steady-state data, whether the air source air conditioner has a system fault.

According to yet another aspect of the present application, further provided is a system performance detecting method for an air source air conditioner, comprising S410, performing the steady-state data processing method as described above; and S420, based on the obtained steady-state data, evaluating the system performance of the air source air conditioner.

According to the steady-state data processing method of the present application, the steady-state data is obtained by screening the data detection period in which the cumulative change of the target data meets the set condition, and based on this, subsequent various data processing methods are performed, including the refrigerant leak detecting method, system performance detecting method, and system fault detecting method for an air source air conditioner. It is therefore expected to obtain more accurate steady-state data and conclude more accurate and reliable determination results.

DETAILED DESCRIPTION

Figure 1:
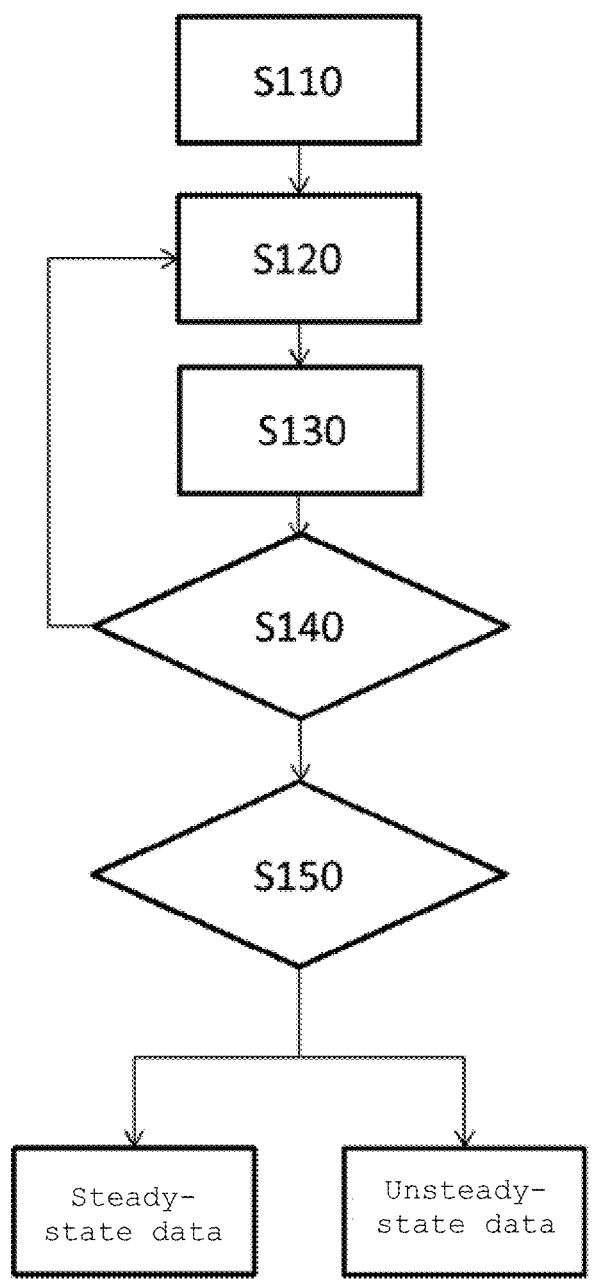
FIG. 1 is a schematic flow chart of one embodiment of a steady-state data processing method of the present application.
Figure 2:
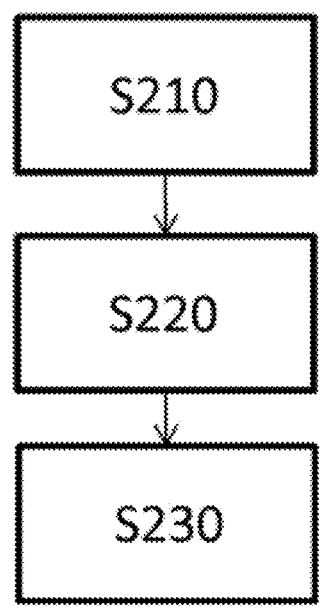
FIG. 2 is a schematic flow chart of one embodiment of a refrigerant leak detecting method for an air source air conditioner of the present application.
Figure 3:
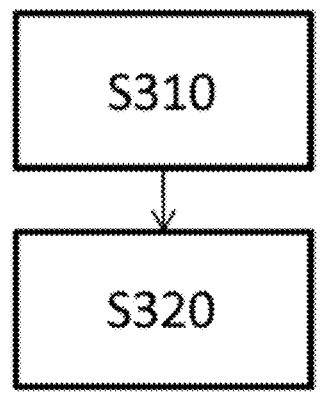
FIG. 3 is a schematic flow chart of one embodiment of a system fault detecting method for an air source air conditioner of the present application.
Figure 4:
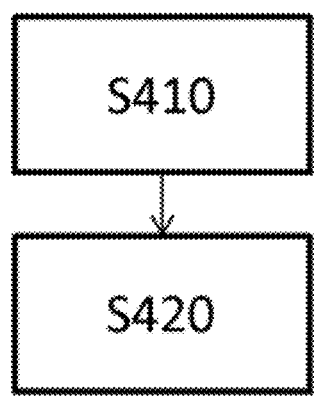
FIG. 4 is a schematic flow chart of one embodiment of a system performance detecting method for an air source air conditioner of the present application.

Referring to FIG. 1, an embodiment of a data processing method is illustrated. In the embodiment, the data processing method includes the following steps that:

S110, a cumulative change of target determination data and a data detection period are reset as 0; S120, the detected target data are obtained; S130, the cumulative change of the target data is calculated; S140, when the calculated cumulative change of the target data is less than its preset threshold, the data detection period is adjusted and the method returns to S120; or a data detection period is recorded when a cumulative change of any of the target data is not less than its preset threshold; and S150, when the recorded data detection period is less than its preset time threshold, a target data result obtained in the period is determined as unsteady-state data of the device; or when the recorded data detection period is not less than its preset time threshold, the target data obtained in the data detection period is determined as steady-state data. If the data obtained is substantially constant or changes slightly within a specified time range, the data is referred to as steady-state data.

First, S110 is executed to reset the cumulative change of target data and a data detection period as 0 to obtain reference values for subsequent data detection and analysis; S120 is then executed to detect the target data by using hardware set on the unit and save the detected target data, for example, detecting the target data in real time; and then S130 is executed to compare the detected target data with the target data of the previous moment, thereby obtaining the cumulative change of the target data, and compare the cumulative change of the target data with its preset threshold; S140 is then executed to analyze the comparison result, including the following cases: in the first case where the cumulative change of the target data is less than the preset threshold, the data detection period is adjusted, for example, in a way of increasing the data detection period by one detection period, and the method returns to S120; and in the second case where the cumulative change of the target data is not less than the preset threshold, the current data detection period is compared with the preset time threshold; and the method continues to execute S150, and in this case, when the data detection period is greater than the preset time threshold, the target data obtained in the data detection period is determined as steady-state data; or when the data detection period is not larger than the preset time threshold, the target data obtained in the data detection period is determined as unsteady-state data. Based on such an arrangement, according to the steady-state data processing method of the present application, the steady-state data is obtained by screening the data detection period in which the cumulative change of the target data meets the set condition, and based on this, subsequent various data processing methods are performed, including a refrigerant leak detecting method, system performance detecting method, and system fault detecting method for an air source air conditioner. It is therefore expected to obtain more accurate steady-state data and conclude more accurate and reliable determination results.

As a more specific implementation manner, when the data processing method is applied to an air source air conditioner, the target data required for steady-state data processing may generally include two types.

The first type of target data herein is an analysis object that is essential for performing subsequent various methods. Typically, it includes compressor frequency or compressor capacity, outdoor ambient temperature, and inlet water temperature of a heat exchanger. The compressor frequency or compressor capacity herein has a great impact on the control over various air source air conditioners, while the outdoor ambient temperature and the inlet water temperature of the heat exchanger have a greater impact on the air source air conditioner. More specifically, to ensure that such data is in a steady state range, and the steady state range provides sufficient reliability and analysis accuracy for subsequent analysis and processing based on this data, the cumulative change of the target data should also be set as follows: the cumulative change of the compressor frequency or compressor capacity is a preset threshold range, for example, ±5%; the cumulative change of the outdoor ambient temperature is a preset threshold range, for example, ±1° C.; and the cumulative change of the inlet temperature of the heat exchanger is a preset threshold range, for example, ±1° C.

In addition, the second type of target data is not an analysis object essential for performing the subsequent various methods, but its existence can further improve the analysis accuracy and reliability, and moreover, corresponding hardware sensor setting and the complexity of the analysis method may be increased. Therefore, whether to perform steady state processing on the second type of target data may be selected according to the ratio of demands for cost and accuracy in actual situations. Typically, the second type of target data may include one or more of the following: an subcooling degree control target value of an air conditioning unit, a suction superheat degree control target value of a compressor, outlet water temperature of the heat exchanger, expansion valve opening, exhaust temperature of the compressor, suction temperature of the compressor, exhaust saturation temperature of the compressor, suction saturation temperature of the compressor, fan speed, inlet saturation temperature of an economizer, outlet temperature of the economizer, and expansion valve opening of the economizer. More specifically, to ensure that such data is in a steady state range, and the steady state range provides sufficient reliability and analysis accuracy for subsequent analysis and processing based on this data, the cumulative change of the target data should also be as follows: the cumulative change of the subcooling degree of the air conditioning unit is a preset threshold range, for example, ±1° C.; the cumulative change of the suction superheat degree of the compressor is a preset threshold range, for example, ±1° C.; the cumulative change of the outlet water temperature of the heat exchanger is a preset threshold range is, for example, ±1° C.; the cumulative change of the expansion valve opening is a preset threshold range, for example, ±5%; the cumulative change of the exhaust temperature of the compressor is a preset threshold range, for example, ±5° C.; the cumulative change of the suction temperature of the compressor is a preset threshold range, for example, ±5° C.; the cumulative change of the exhaust saturation temperature of the compressor is a preset threshold range, for example, ±1° C.; the cumulative change of the suction saturation temperature of the compressor is a preset threshold range, for example, ±1° C.; the cumulative change of the fan speed is a preset threshold range, for example, ±5%; the cumulative change of the inlet saturation temperature of the economizer is a preset threshold range, for example, ±1° C.; the cumulative change of the outlet temperature of the economizer is a preset threshold range, for example, ±1° C.; the cumulative change of the expansion valve opening of the economizer is a preset threshold range, for example, ±5%.

Furthermore, the objective of the present application is to determine whether the afore-mentioned cumulative change of the target data within a data detection period exceeds a preset threshold and based on this, determine whether the detected data is steady-state data. In this determination process, the time concept of data detection period is also involved. In some embodiments of the present application, the preset time threshold is selected as a preset threshold, with a reference value of 5 minutes, to avoid, on one hand, the problem that it is difficult to obtain steady-state data due to a too long period and also avoid, on the other hand, the problem that the data collected is not sufficient for performing subsequent analysis due to a too short period.

On the basis that the present application provides the teaching of the afore-mentioned steady-state data processing method, various embodiments of application of the processing method to air source air conditioning units are also presented herein, as will be exemplarily described below.

Specifically, further provided herein is a refrigerant leak detecting method for an air source air conditioner, including S210, performing the data processing method in the embodiments described above; and S220, determining, based on the obtained steady-state data, whether a refrigerant leak occurs in the air source air conditioner; and subsequent S230, taking an alarm action when determining that a refrigerant leak occurs in the air source air conditioner. Based on such an arrangement, since all the obtained data is in a desired steady state, the analysis based on these data will be more reliable, and the refrigerant leak behavior of the air source air conditioner can be accurately alarmed to prevent leak expansion or long-time leak from affecting system performance.

In this method, if it is required to determine whether a refrigerant leak occurs in the air source air conditioner, it is optional that the target data, as the object of the determination, should include all of the first type of target data, i.e., the compressor frequency or compressor capacity, the outdoor ambient temperature, and the water inlet temperature of the heat exchanger.

Optionally, if it is required to further improve the accuracy of the determination, the target data, as the object of the determination, may also include one or more of the second type of target data, i.e., the subcooling degree of the air conditioning unit, the suction superheat degree of the compressor, the outlet water temperature of the heat exchanger, the expansion valve opening, the exhaust temperature of the compressor, the suction temperature of the compressor, the exhaust saturation temperature of the compressor, the suction saturation temperature of the compressor, the fan speed, the inlet saturation temperature of the economizer, the outlet temperature of the economizer, and the expansion valve opening of the economizer, in addition to all of the first type of target data, i.e., the compressor frequency or compressor capacity, the outdoor ambient temperature, and the water inlet temperature of the heat exchanger.

For example, in one embodiment, in order to determine whether a refrigerant leak occurs in the air source air conditioner, the data to be required includes the compressor frequency or compressor capacity, the outdoor ambient temperature, and the water inlet temperature of the heat exchanger; and the suction superheat degree or expansion valve opening of the compressor. More specifically, for a unit operating in a heating mode, at the current outdoor ambient temperature, when the compressor frequency or the compressor capacity is greater than a corresponding set value and the difference between the inlet and outlet water temperature of a heat exchanger is less than a set value, it then may be considered that there is a greater possibility of refrigerant leak; or when the difference between the inlet and outlet water temperature of the heat exchanger is not less than the set value, but the expansion valve opening is 100% and the actual superheat degree is greater than a set value, it also may be considered that there is a greater possibility of refrigerant leak. For another example, in another embodiment, in order to determine whether a refrigerant leak occurs in the air source air conditioner, the steady-state data to be required includes the compressor frequency or compressor capacity, the outdoor ambient temperature, and the water inlet temperature of the heat exchanger; and the suction superheat degree of the compressor and the subcooling degree of the air conditioning unit of the second type of target data. More specifically, for a unit operating in a cooling mode, at the current outdoor ambient temperature, when the compressor frequency or the compressor capacity is greater than a corresponding set value and the difference between the inlet and outlet water temperature of a heat exchanger is less than a set value, it then may be considered that there is a greater possibility of refrigerant leak; or when the difference between the inlet and outlet water temperature of the heat exchanger is not less than the set value, but the actual subcooling degree is less than a set value, it also may be considered that there is a greater possibility of refrigerant leak; or when the subcooling degree is not less than a set value but the actual superheat degree is larger than a set value, it also may be considered that there is a greater possibility of refrigerant leak. Furthermore, the above-mentioned two types of target data and combinations thereof which are listed or not listed but have been mentioned above can realize the determination of the refrigerant leak phenomenon of the air source air conditioner. The only difference is the further improvement of the implementation difficulty and accuracy.

In addition, the steady-state data obtained in the data processing method may also be applied to determination of other system faults of air source air conditioners to improve the analysis or determination accuracy. Therefore, further provided herein is a system fault detecting method for an air source air conditioner, comprising S310, performing the data processing method in the embodiments described above; and S320, determining, based on the obtained steady-state data, whether the air source air conditioner has a system fault. Based on such an arrangement, since all the obtained data is in a desired steady state, the analysis based on these data will be more reliable. Moreover, corresponding various faults of the air source air conditioner can be accurately alarmed on the basis of the corresponding steady-state data, so as to repair such faults as soon as possible.

Further provided herein is a system performance detecting method for an air source air conditioner, comprising S410, performing the data processing method in the embodiments described above; and S420, based on the obtained steady-state data, evaluating the system performance of the air source air conditioner. Based on such an arrangement, since all the obtained data is in a desired steady state, the analysis based on these data will be more reliable, and the corresponding system performance of the air source air conditioner can be accurately evaluated on the basis of the corresponding steady-state data, so as to obtain the health degree of the current operation performance of the unit.

The above examples mainly illustrate the data processing method, the refrigerant leak detecting method for an air source air conditioner, the system performance detecting method, and the system fault detecting method of the present application. While only a few of the embodiments of the present application have been described, it will be understood by those skilled in the art that the present application may be implemented in many other forms without departing from the spirit and scope of the present application. The present examples and implementation manners are to be considered as illustrative and nonrestrictive, and the present application may cover various modifications and replacements without departing from the spirit and scope of the present application as defined by the appended claims.

What is claimed is:

1. A data processing method, comprising:
   resetting a cumulative change of target data and a data detection period as zero;
   obtaining the target data from an air source air conditioner, wherein obtaining the target data occurs in real time;
   obtaining the cumulative change of the target data, and comparing the obtained cumulative change with a preset threshold;
   when the cumulative change of the target data is less than the preset threshold, adjusting the data detection period or when the cumulative change of the target data is not less than the preset threshold, comparing the current data detection period with a preset time threshold;
   when the data detection period is greater than the preset time threshold, determining the target data obtained in the data detection period as steady-state data or when the data detection period is not greater than the preset time threshold, determining the target data obtained in the data detection period as unsteady-state data;
   processing the steady-state data to evaluate condition of the air source air conditioner;
   determining whether a refrigerant leak occurs in the air source air conditioner in response to the processing the steady-state data.

2. The data processing method according to claim 1, wherein the target data comprises a first type of target data of the air source air conditioner: compressor frequency or compressor capacity, outdoor ambient temperature, and water inlet temperature of a heat exchanger.

3. The data processing method according to claim 2, wherein the cumulative change of the target data is as follows: the cumulative change of the compressor frequency or the compressor capacity is ±5%; the cumulative change of the outdoor ambient temperature is ±1° C.; the cumulative change of the inlet water temperature of the heat exchanger is ±1° C.

4. The data processing method according to claim 2, wherein the target data comprises a second type of target data of the air source air conditioner, comprising one or more of the following: overcooling degree of an air conditioning unit, suction superheat degree of a compressor, outlet water temperature of the heat exchanger, expansion valve opening, exhaust temperature of the compressor, suction temperature of the compressor, exhaust saturation temperature of the compressor, suction saturation temperature of the compressor, fan speed, inlet saturation temperature of an economizer, outlet temperature of the economizer, and expansion valve opening of the economizer.

5. The data processing method according to claim 4, wherein the cumulative change of the target data is as follows: the cumulative change of the overcooling degree of the air conditioning unit is ±1° C.; the cumulative change of the suction superheat degree of the compressor is 1° C.; the cumulative change of the outlet water temperature of the heat exchanger is ±1° C.; the cumulative change of the expansion valve opening is ±5%; the cumulative change of the exhaust temperature of the compressor is ±5° C.; the cumulative change of the suction temperature of the compressor is ±5° C.; the cumulative change of the exhaust saturation temperature of the compressor is ±1° C.; the cumulative change of the suction saturation temperature of the compressor is ±1° C.; the cumulative change of the fan speed is ±5%; the cumulative change of the inlet saturation temperature of the economizer is ±1° C.; the cumulative change of the outlet saturation temperature of the economizer is ±1° C.; and the cumulative change of the expansion valve opening of the economizer is ±5%.

6. A refrigerant leak detecting method for an air source air conditioner, comprising:

executing the data processing method of claim 3;

the steady-state data including at least one of (i) the first type of target data of the air source air conditioner including one or more of compressor frequency or compressor capacity, outdoor ambient temperature, and water inlet temperature of a heat exchanger and (ii) a second type of target data of the air source air conditioner, including one or more of overcooling degree of an air conditioning unit, suction superheat degree of a compressor, outlet water temperature of the heat exchanger, expansion valve opening, exhaust temperature of the compressor, suction temperature of the compressor, exhaust saturation temperature of the compressor, suction saturation temperature of the compressor, fan speed, inlet saturation temperature of an economizer, outlet temperature of the economizer, and expansion valve opening of the economizer.

7. The refrigerant leak detecting method according to claim 6, further comprising: taking an alarm action when a refrigerant leak occurs in the air source air conditioner.

8. The refrigerant leak detecting method according to claim 6, wherein when the target data comprises the first type of target data, the steady-state data is the first type of target data only.

9. The refrigerant leak detecting method according to claim 8, wherein when the target data comprises the second type of target data, the steady-state data comprises: all of the first type of target data; and one or more of the second type of target data.

10. The refrigerant leak detecting method according to claim 9, wherein the steady-state data comprises: all of the first type of target data; and the superheat degree or the expansion valve opening in the second type of target data.

11. The refrigerant leak detecting method according to claim 9, wherein the steady-state data comprises: all of the first type of target data; and the superheat degree and the overcooling degree in the second type of target data.

12. A fault detecting method for an air source air conditioner, comprising:

executing the data processing method of claim 2; and based on the steady-state data, determining whether the air source air conditioner has a system fault;

the steady-state data including at least one of (i) the first type of target data of the air source air conditioner including one or more of compressor frequency or compressor capacity, outdoor ambient temperature, and water inlet temperature of a heat exchanger and (ii) a second type of target data of the air source air conditioner, including one or more of overcooling degree of an air conditioning unit, suction superheat degree of a compressor, outlet water temperature of the heat exchanger, expansion valve opening, exhaust temperature of the compressor, suction temperature of the compressor, exhaust saturation temperature of the compressor, suction saturation temperature of the compressor, fan speed, inlet saturation temperature of an economizer, outlet temperature of the economizer, and expansion valve opening of the economizer.

13. A system performance detecting method for an air source air conditioner, comprising:

executing the data processing method of claim 2; and based on the steady-state data, evaluating the system performance of the air source air conditioner;

the steady-state data including at least one of (i) the first type of target data of the air source air conditioner including one or more of compressor frequency or compressor capacity, outdoor ambient temperature, and water inlet temperature of a heat exchanger and (ii) a second type of target data of the air source air conditioner, including one or more of overcooling degree of an air conditioning unit, suction superheat degree of a compressor, outlet water temperature of the heat exchanger, expansion valve opening, exhaust temperature of the compressor, suction temperature of the compressor, exhaust saturation temperature of the compressor, suction saturation temperature of the compressor, fan speed, inlet saturation temperature of an economizer, outlet temperature of the economizer, and expansion valve opening of the economizer.

14. The data processing method according to claim 1, wherein the preset time threshold is 5 minutes.

\* \* \* \* \*